No. 889,515.  
PATENTED JUNE 2, 1908.  
J. A. FOLEY.  
EDUCATIONAL DEVICE.  
APPLICATION FILED NOV. 19, 1907.
3 SHEETS—SHEET 1.
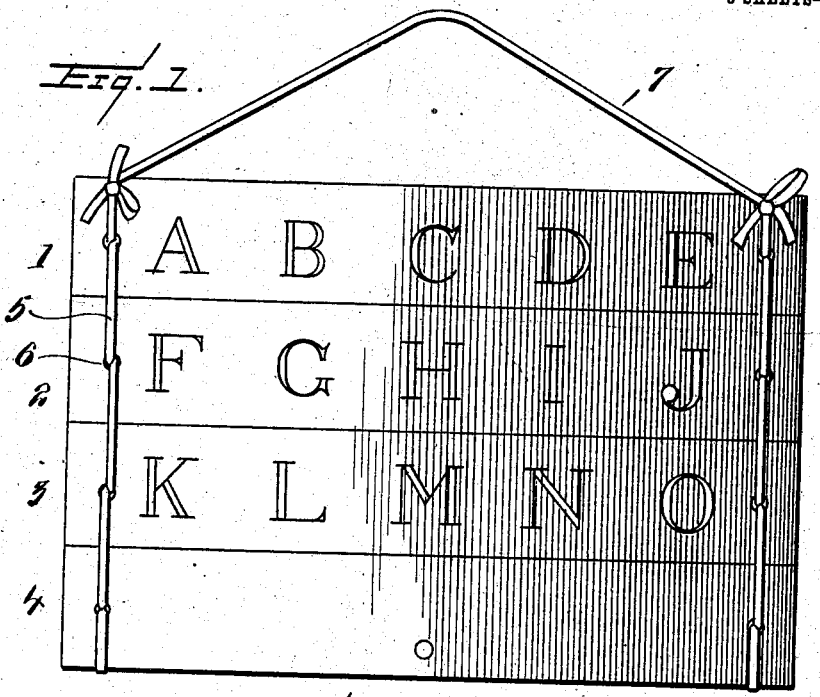
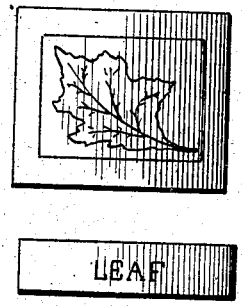
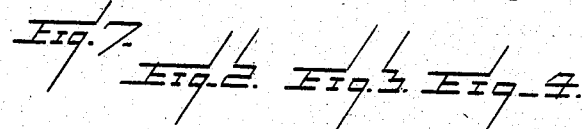
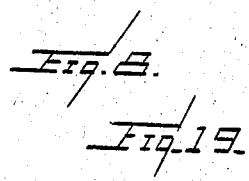
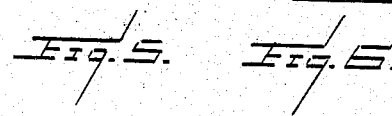
WITNESSES:
INVENTOR
Julia A. Foley
BY
Attorneys No. 889,515. PATENTED JUNE 2, 1908.
J. A. FOLEY.
EDUCATIONAL DEVICE.
APPLICATION FILED NOV. 19, 1907.
3 SHEETS—SHEET 2.
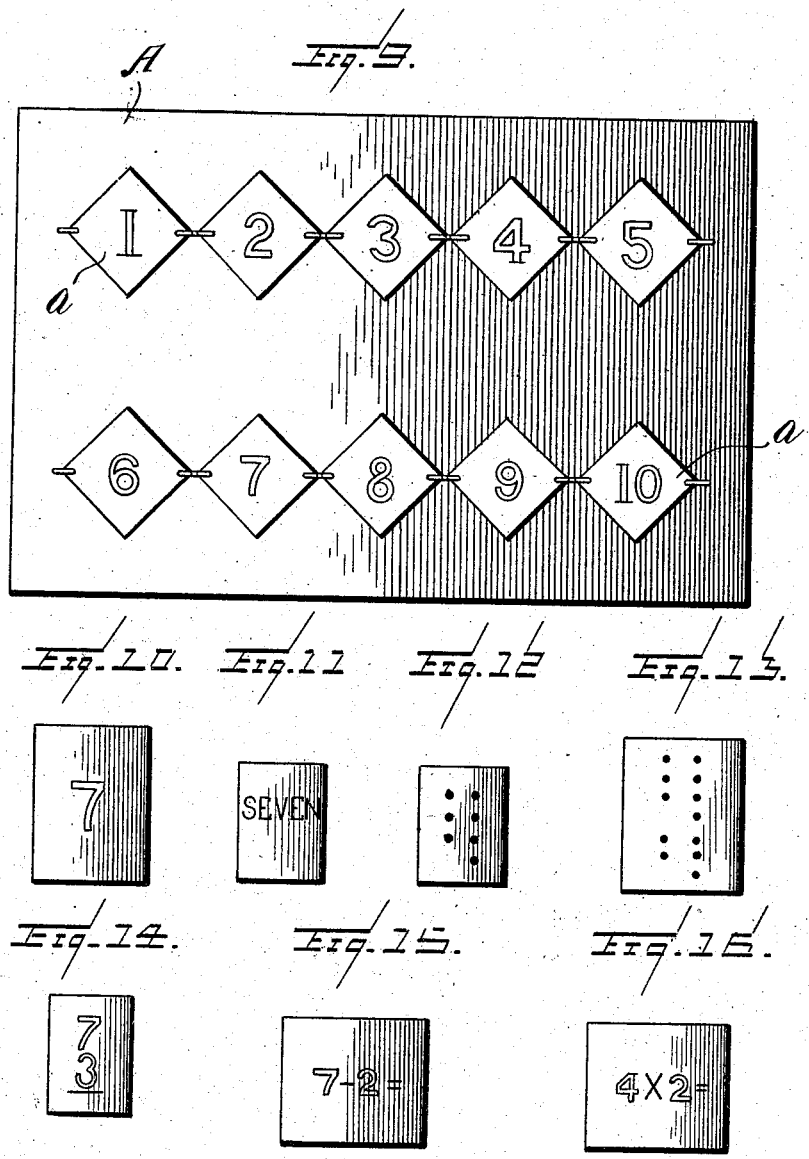

No. 889,515. PATENTED JUNE 2, 1908.
J. A. FOLEY.
EDUCATIONAL DEVICE.
APPLICATION FILED NOV. 19, 1907.
3 SHEETS—SHEET 3.
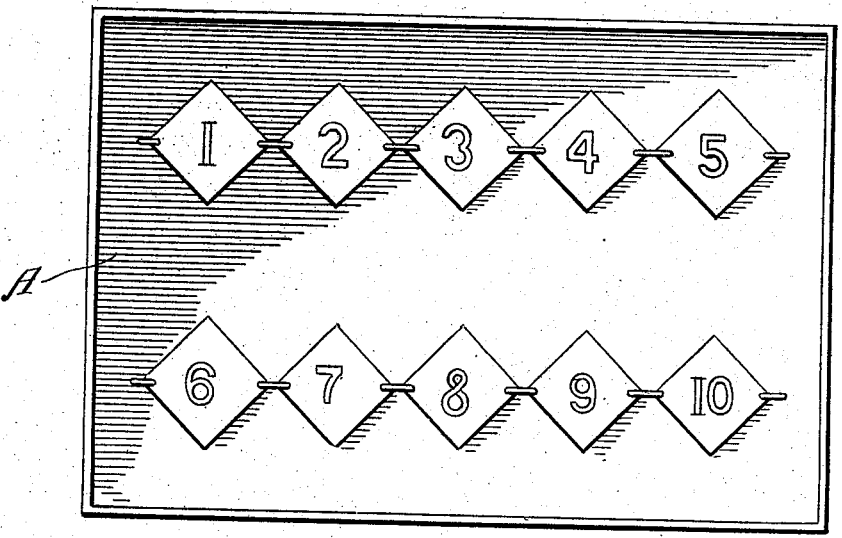
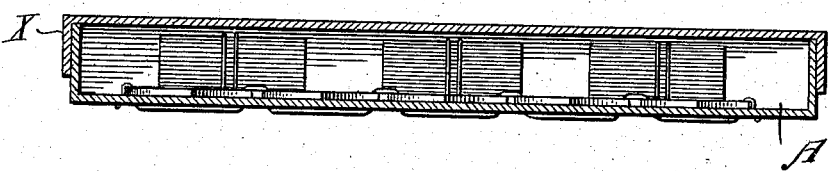
WITNESSES
INVENTOR
Julia A. Foley.
BY
Attorneys

UNITED STATES PATENT OFFICE.

JULIA A. FOLEY, OF PHILADELPHIA, PENNSYLVANIA.

EDUCATIONAL DEVICE.

No. 889,515.　　　Specification of Letters Patent.　　　Patented June 2, 1908.

Application filed November 19, 1907. Serial No. 402,880.

*To all whom it may concern:*

Be it known that I, JULIA A. FOLEY, citizen of the United States, residing at Germantown, Philadelphia, in the county of Philadelphia and State of Pennsylvania, have invented certain new and useful Improvements in Educational Devices; and I do hereby declare the following to be a full, clear, and exact description of the invention, such as will enable others skilled in the art to which it appertains to make and use the same.

My invention relates to educational devices and consists of certain improvements in the same, which are set forth in the annexed specification and more particularly specified in the claims.

The object of my invention is to provide a simplified means for teaching language, arithmetic, or other branch of learning, by providing a holder bearing certain characters, which is designed to be placed before the eyes of the pupils, and a series of disks, cards, or similar devices bearing thereon characters which bear a visual relation to the character shown on the holder, and which are designed to be placed in the hands of the pupils. These disks, cards, or the like may be removably placed in the holder, which is provided with means for detachably receiving them, and adjacent to the particular character which matches the character on the same disk or card.

In the drawings which accompany the specification, Figures 1 to 8 represent my devices as used in teaching the alphabet and words, and Figs. 9 to 16 represent my devices as applied to the teaching of arithmetic and numbers.

Referring more specifically to the drawings, Fig. 1 is a front elevation of the holder. Figs. 2 to 8 represent disks or cards bearing characters to be used in conjunction with the holder. Fig. 9 is a front view of a modification of the holder as used in number work, and Figs. 10 to 16 are views of cards or disks to be used in conjunction therewith. Fig. 17 is a plan view of a modification of my device, and Fig. 18 is a sectional view of the same. Fig. 19 is a view in cross section of the device.

Similar reference characters indicate identical parts throughout.

The holder consists preferably of a piece of sheet material of any desirable size, shape or color, to which there are removably secured a series of transverse strips bearing the characters to be matched. In practice I prefer to make the foundation sheet of stiff card board, rectangular in shape. Transverse strips of a similar material, 1, 2, 3, 4 are secured to the foundation sheet by means of cord or wire 5 or other suitable material, which is passed through eyelets 6 in the strips and foundation sheet and finally terminates in a loop 7, by which the holder may be suspended.

In Fig. 1 I have shown the foundation sheet provided with three strips bearing fifteen letters of the alphabet, while similar strips bearing the remaining letters of the alphabet are secured in a similar manner to the reverse side of the foundation sheet.

In connection with the holder just described, I use packs of cards bearing different characters. For example, there will be a pack of cards bearing all the large Roman letters of the alphabet, such as A in Fig. 2, and the pupil is called upon to find in this pack the different letters as called for, to match the letters on the strips. If A is called for the pupil finds A in the pack and places it over A and between the strip 1 and the foundation sheet, where it is held by frictional contact, and so with the characters in Figs. 3, 4 and 5.

When it is sought to teach the blind, the strips 1, 2 and 3 may be provided with raised letters and in connection therewith, I use packs of raised letters such as illustrated in Fig. 6 and in the same manner as above described.

When it is desired to teach the pupil the name of objects, I provide cards with pictures on them, such as the leaf shown in Fig. 7, and other cards or disks bearing the names of such objects. A corner of the object card is inserted in the holder between the strip 4 and the main sheet and the pupil is instructed to find and place upon it the card bearing the name of the object, or the name of the object, such as leaf, may be placed in the holder and the pupil instructed to find the proper object card.

It is obvious that a great many different combinations may be made in this way, and of an infinite variety. Also that there may be many modifications of the foundation sheet which may be made of wood or hard rubber or other suitable material. For example I may use a shallow tray instead of the sheet, and may provide the tray with a cover, thus forming a box which will hold the different packs of cards or disks to be used in conjunction with the holder. In this construction the bottom of the tray forms the base A, or foundation sheet and the transverse strips are secured thereto in the manner already described. When not in use the tray and contents may be protected by a cover X.

The modification shown in Fig. 9, for use in number work consists of a main foundation sheet or tray A, similar to that already described, and a series of separated parts a preferably made of card board and removably secured thereto.

In practice I pass a continuous cord or wire through one corner of each of the separated parts a and the foundation sheet, to form the holder, and fasten the cord at either end in any desirable manner. In Fig. 9 I show two rows of the separated parts a bearing the numerals 1 to 10. It is obvious that an object, such as a card or disk, may be inserted between one of the parts a and the foundation sheet and held in place.

To teach the pupil numbers, a series of cards or disks, such as is represented in Figs. 10 and 11, are provided and instructions are given to match a given numeral on the holder. If the given numeral is 7, the pupil places in the holder the card or disk represented in Figs. 10 or 11.

If addition is to be taught, the pupil is instructed that the sum of the dots represented in Fig. 12, equals 7 and hence when asked what the sum of the dots shown in Fig. 12 is, places the card or disk in the holder, above the numeral 7. So in subtracting the three dots from the seven dots in Fig. 13, the result would be four and the card represented in Fig. 13, would be placed in the holder at 4, so also with the cards shown in Figs. 14 and 15.

In multiplication the system is the same and as the result of multiplying four by two, as shown in Fig. 16, is 8, that card would be placed in the holder over the character 8.

It is obvious that many changes in details of construction of my device may be made without departing from the spirit of my invention.

What I claim and desire to secure by Letters Patent is:—

1. An educational device comprising a main portion, portions removably secured to the main portion to form a holder and bearing different characters, and a series of detached parts adapted to be removably secured in the holder and bearing characters having a visual relation to the characters on the holder, substantially as described.

2. An educational device comprising a holder provided with characters and a series of detached parts adapted to be removably secured in the holder and bearing characters identical with the characters on the holder, substantially as described.

3. In an educational device, the combination with a flat main portion of sheet material, of flat retaining devices of similar material having a plurality of characters indicated thereon, means for fastening the retaining devices to the main portion and a plurality of separate cards having thereon characters bearing a visual relation to the characters on the retaining devices and adapted to be inserted between the main portion and the retaining devices and held by frictional contact, substantially as described.

4. In an educational device, the combination with a flat main portion, of flat retaining devices having a plurality of characters indicated thereon, means for fastening the retaining devices to the main portion at intervals, and a plurality of separate cards having thereon characters bearing a visual relation to the characters on the retaining devices and adapted to be inserted between the main portion and the retaining devices, and the fastening means, and held by frictional contact, substantially as described.

5. An educational device comprising a receptacle, the bottom of which is provided with a plurality of retaining devices bearing characters thereon, a plurality of separate devices having characters thereon bearing a visual relation to the characters on the retaining devices, the said separate devices being adapted to be inserted between the retaining devices and the main portion, and removed therefrom independently of each other, and a cover for said receptacle, substantially as described.

In testimony whereof I affix my signature, in the presence of two witnesses.

JULIA A. FOLEY.

Witnesses:
GEO. MECKE,
LOUISE E. KEPHART.